United States Patent
Blanchet

(10) Patent No.: US 12,025,247 B2
(45) Date of Patent: Jul. 2, 2024

(54) MOUNTING ASSEMBLY INCLUDING TWO END PIECES HELD FITTED BY A BELT

(71) Applicant: CAILLAU, Issy-les-Moulineaux (FR)

(72) Inventor: Martial Blanchet, Romorantin-Lanthenay (FR)

(*) Notice: Subject to any disclaimer, the term of this patent is extended or adjusted under 35 U.S.C. 154(b) by 0 days.

(21) Appl. No.: 17/751,827

(22) Filed: May 24, 2022

(65) Prior Publication Data

US 2022/0381382 A1    Dec. 1, 2022

(30) Foreign Application Priority Data

May 28, 2021  (FR) ...................................... 21 05577
Dec. 15, 2021  (FR) ...................................... 21 13590

(51) Int. Cl.
  *F16L 23/08*  (2006.01)
  *F16L 21/06*  (2006.01)
(52) U.S. Cl.
  CPC .................................. *F16L 21/065* (2013.01)
(58) Field of Classification Search
  CPC ......... F16L 17/04; F16L 21/065; F16L 23/08; F16L 23/003; F16L 23/006; F16L 23/04
  See application file for complete search history.

(56) References Cited

U.S. PATENT DOCUMENTS

2021/0018124 A1   1/2021  Caillau
2021/0148498 A1*  5/2021  Jacquelin ............. F16L 23/003

FOREIGN PATENT DOCUMENTS

EP      3825594 A1     5/2021
FR      3098882 A1     1/2021
WO   2020/065276 A1    4/2020

* cited by examiner

*Primary Examiner* — Aaron M Dunwoody
(74) *Attorney, Agent, or Firm* — Cabinet Beau de Lomenie; Jonathan Bingham; Brian Gordaychik

(57) ABSTRACT

A mounting assembly including two end pieces whose ends are able to be fitted along an axis and a mounting belt disposed around the second end piece in a pre-mounted configuration before the fitting of the first end piece by an opening delimited by a first edge of the belt. The end pieces have respectively a first and a second centering surface able, in the fitted state, to axially overlap and to come into contact to limit the relative clearances of the end pieces. The belt carries a retaining lug which extends outside the belt. In the pre-mounted state, the end pieces are retained in the fitted state by the combination of contact of the centering surfaces and cooperation of the free end of the retaining lug with a bearing surface of the first end piece located on the side of the first edge of the belt.

19 Claims, 17 Drawing Sheets

[Fig. 1]
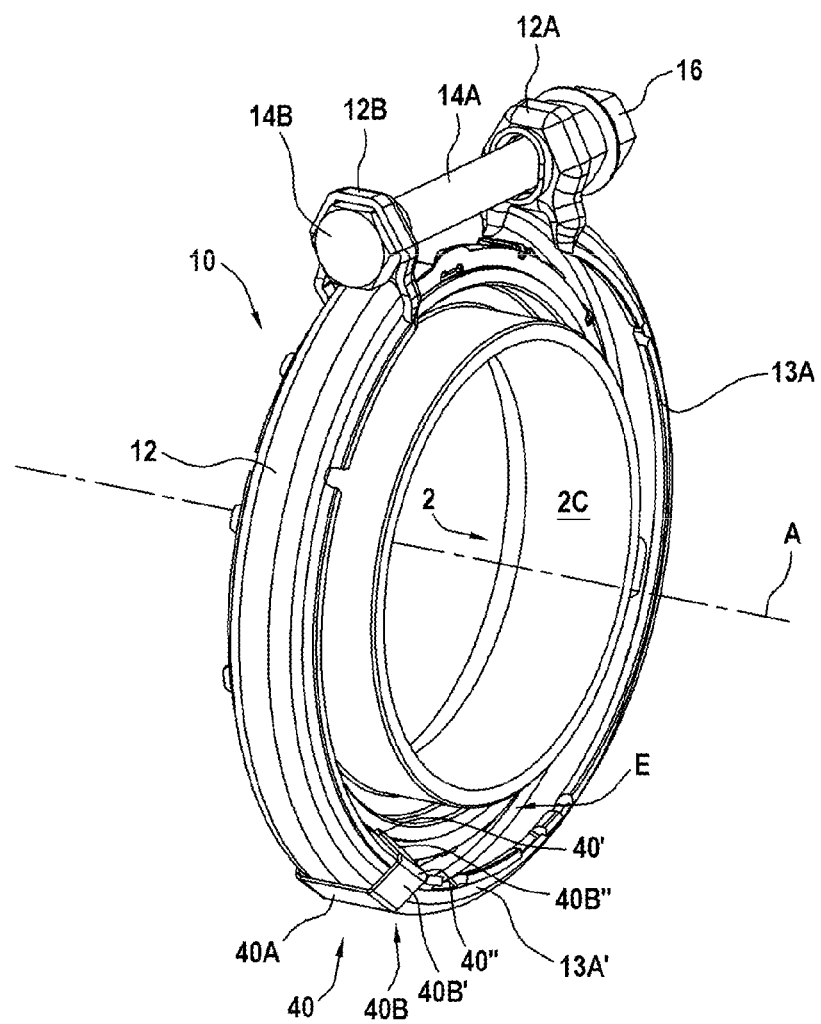

[Fig. 2]
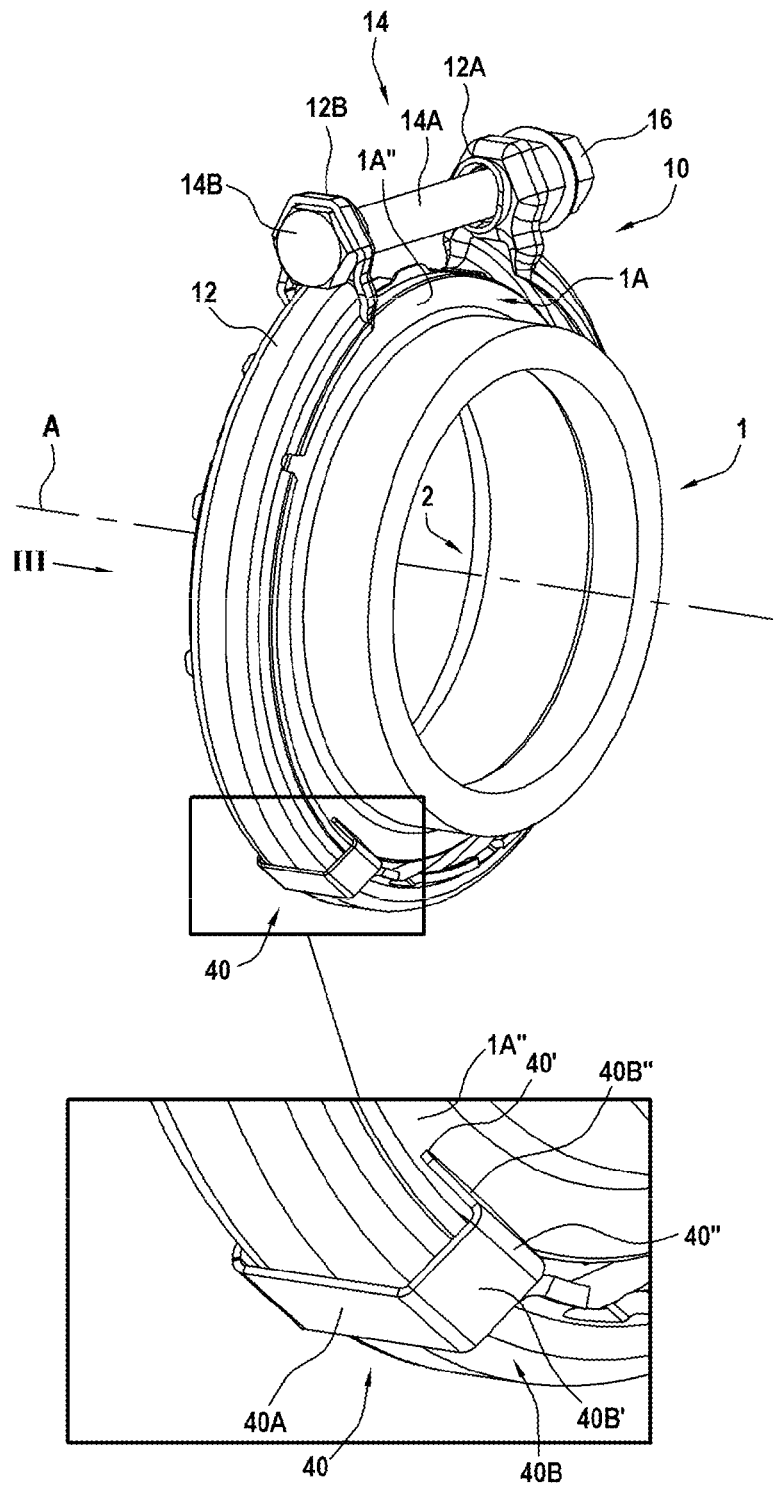

[Fig. 3]
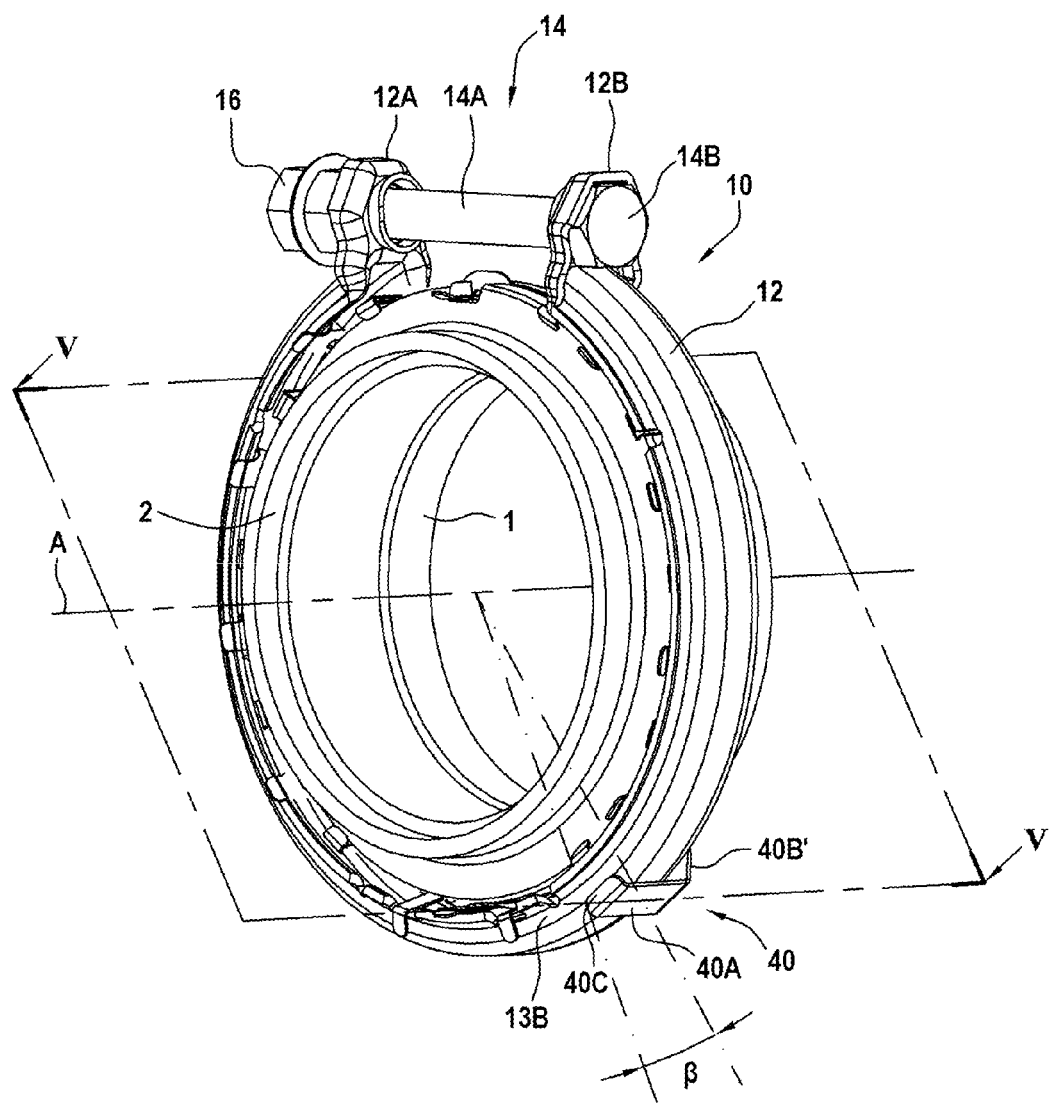

[Fig. 4]
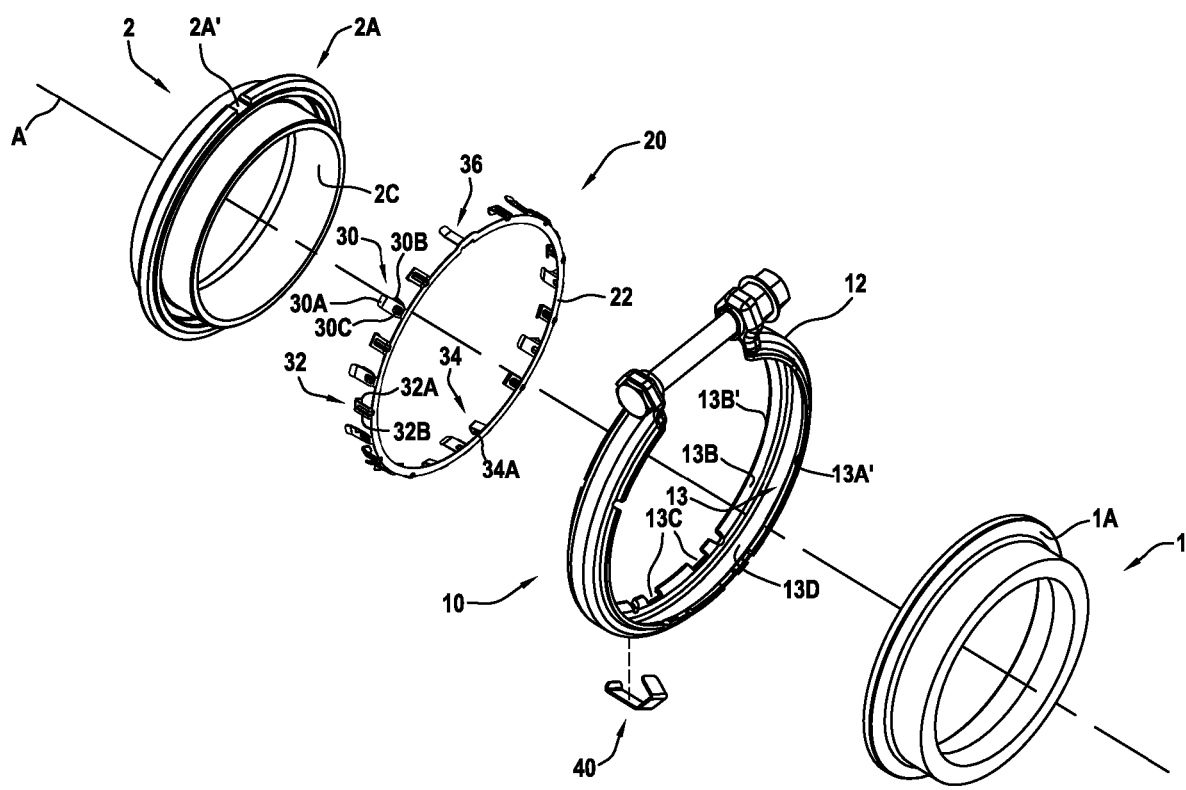

[Fig. 5]
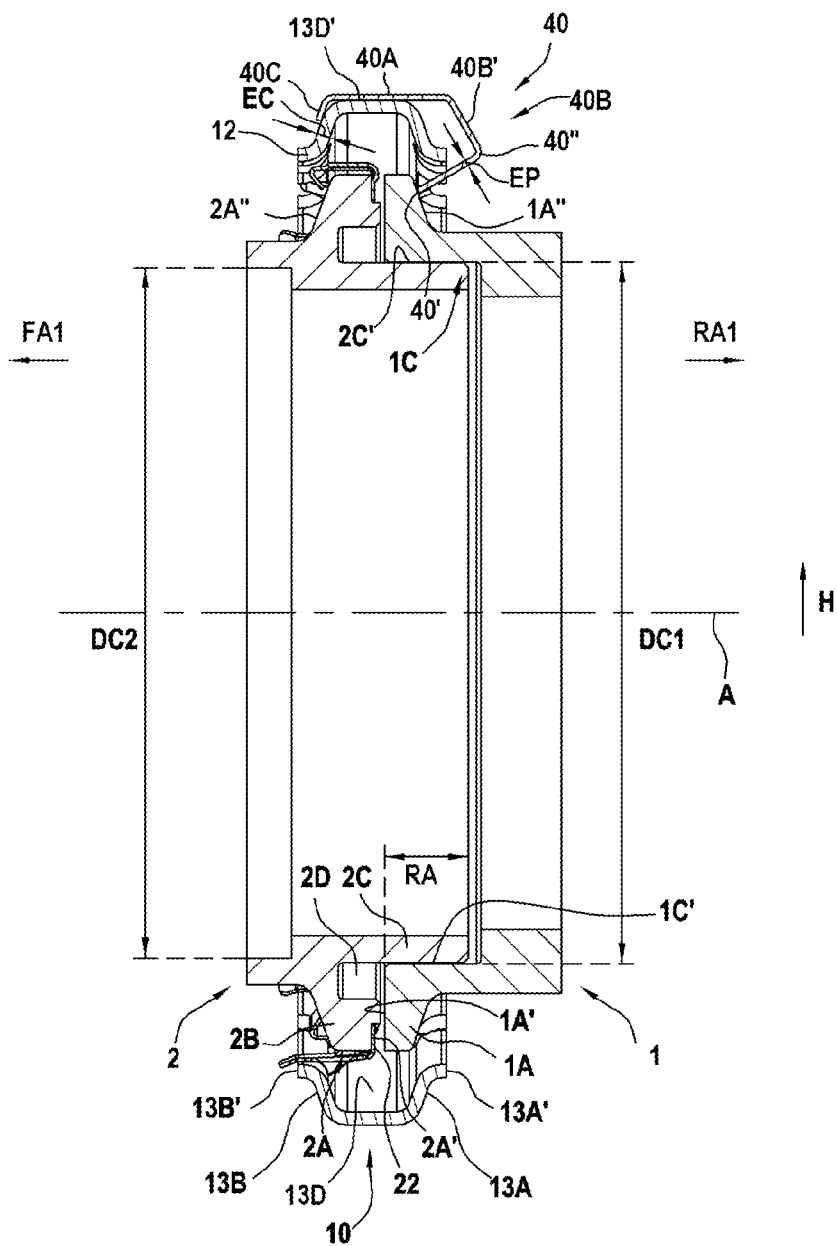

[Fig. 6]
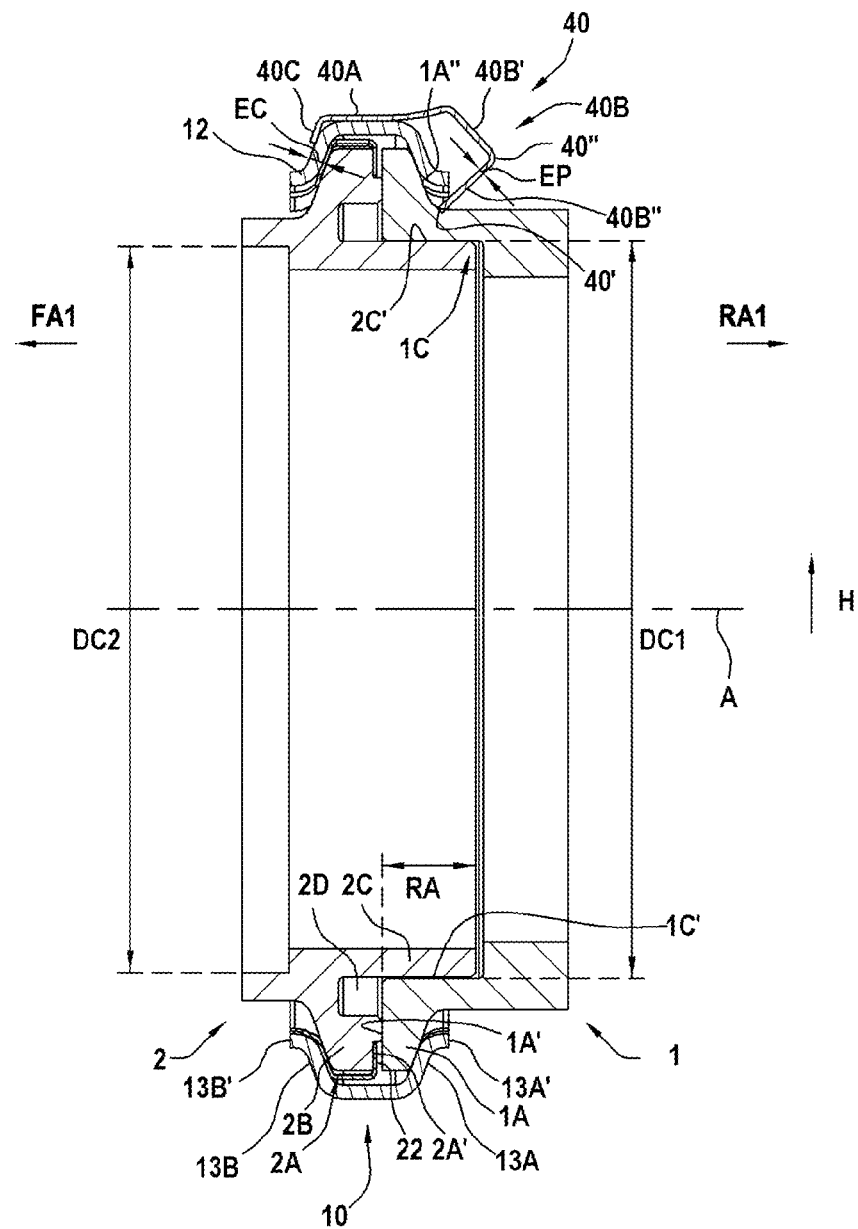

[Fig. 7]
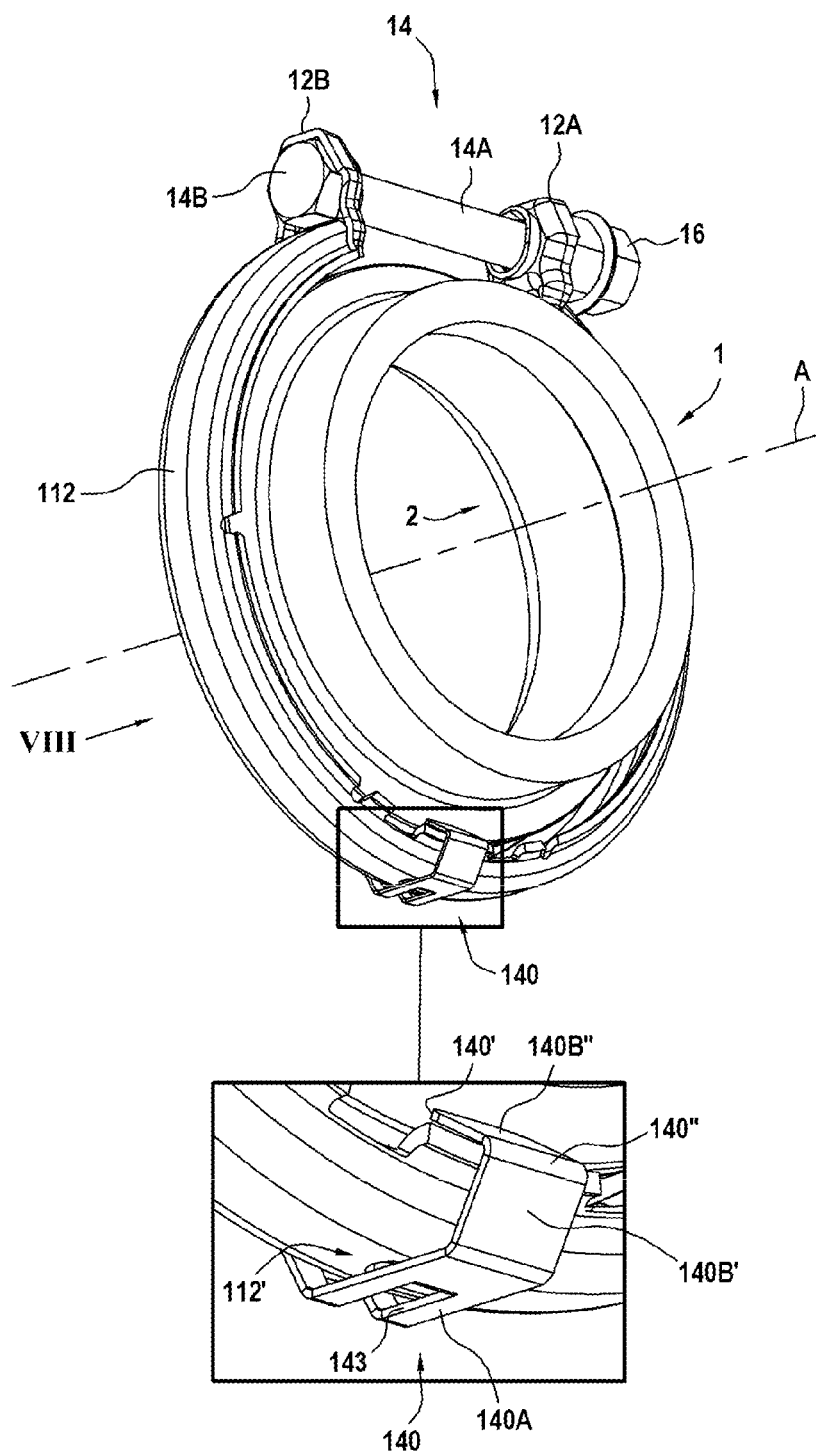

[Fig. 8]
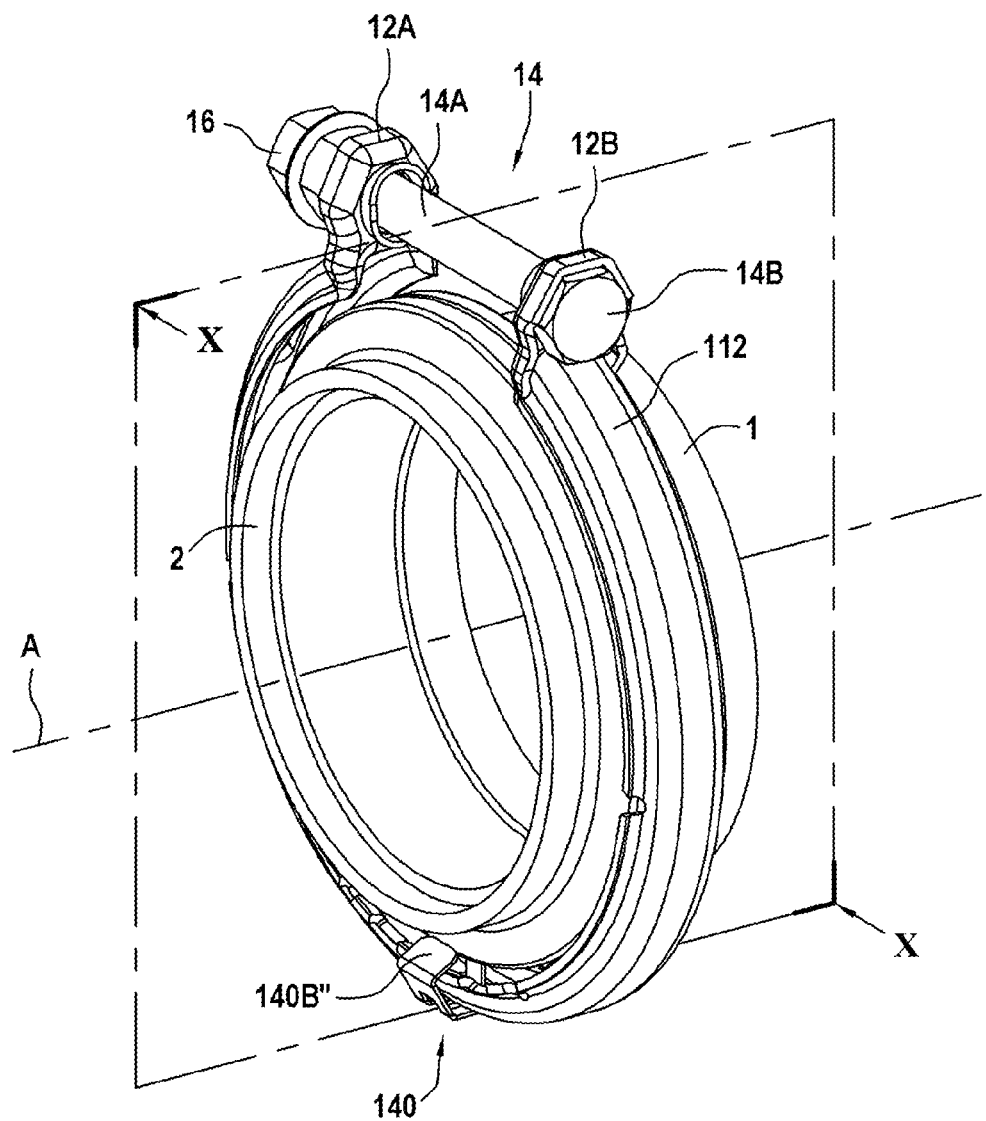

[Fig. 9]
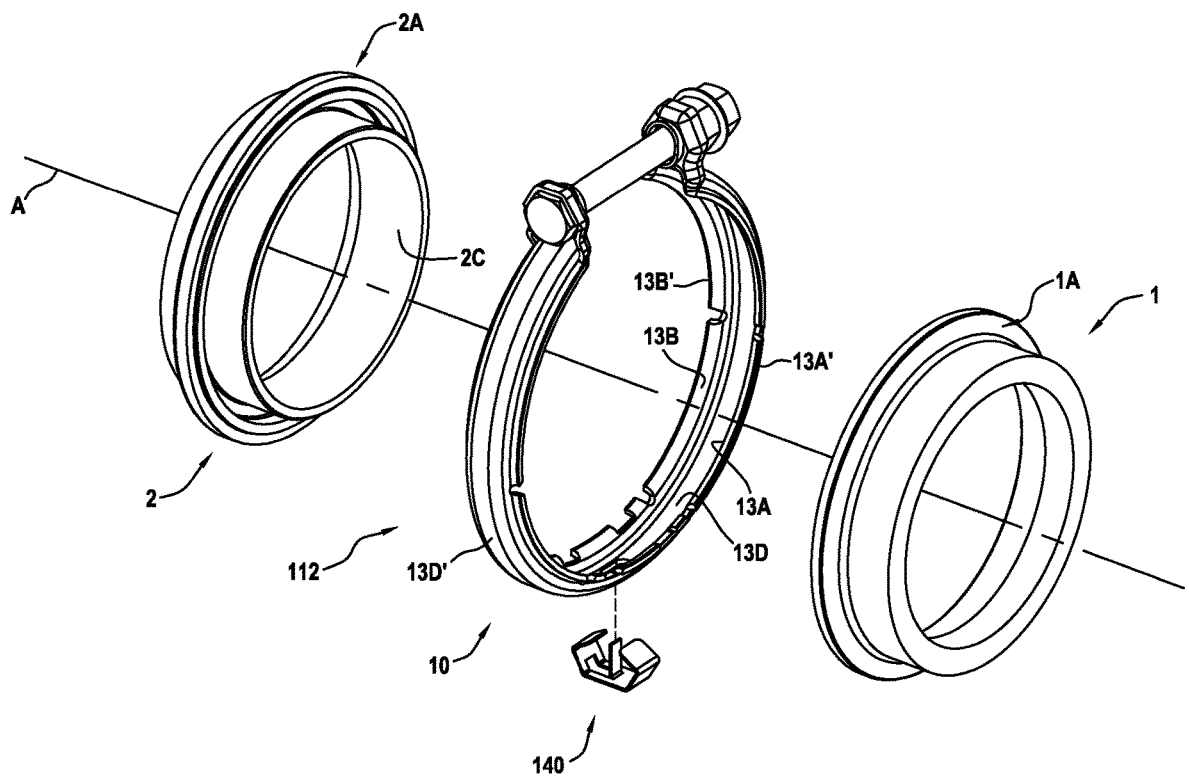

[Fig. 10]
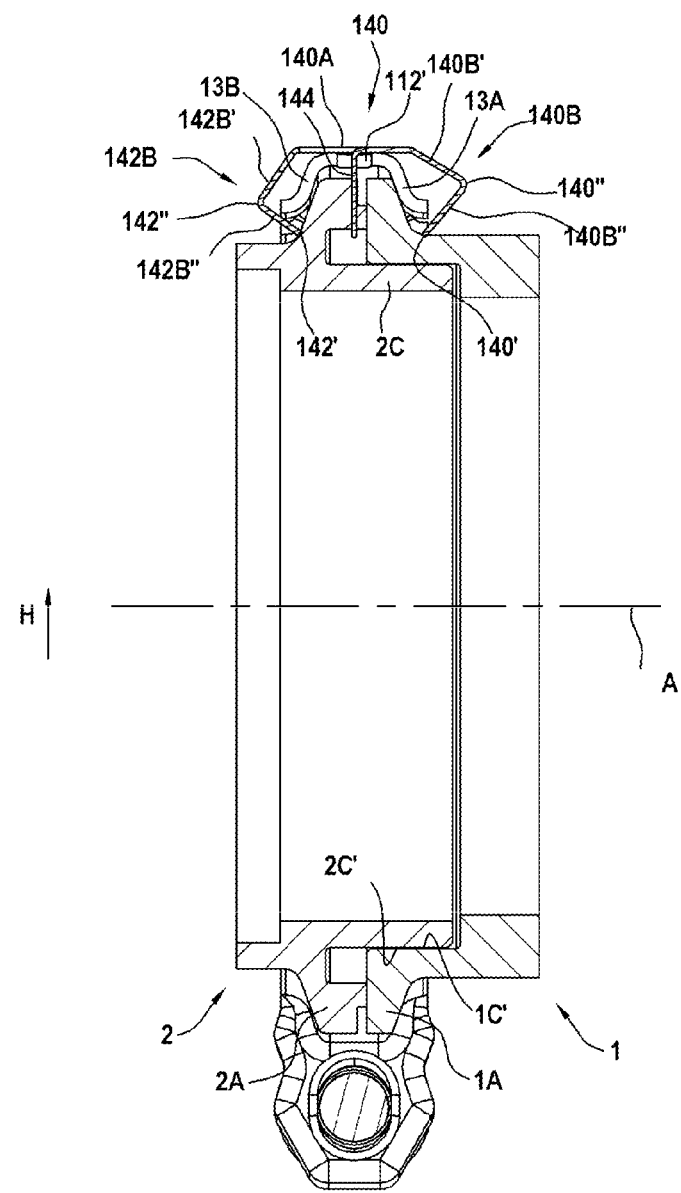

[Fig. 11]
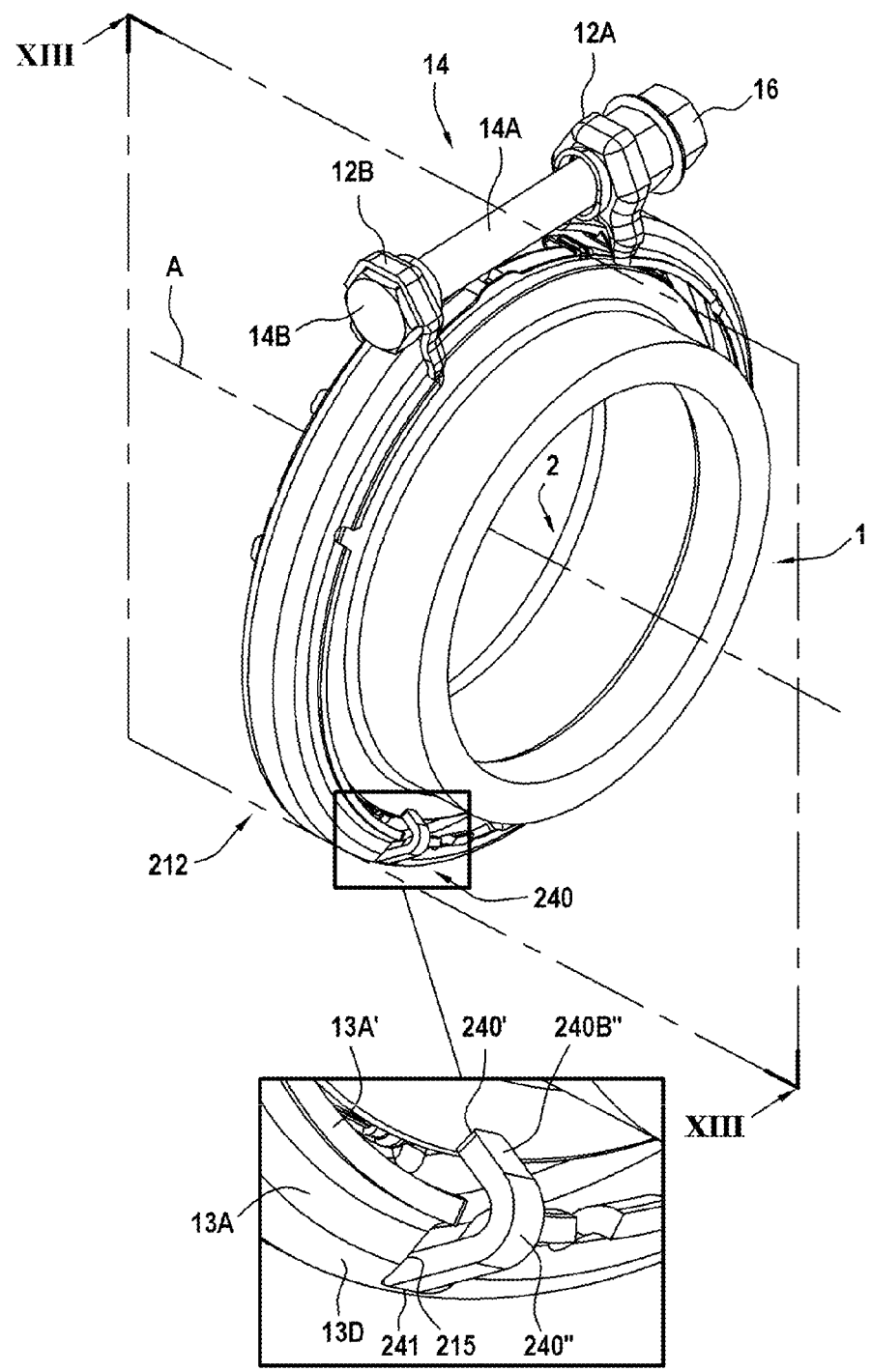

[Fig. 12]
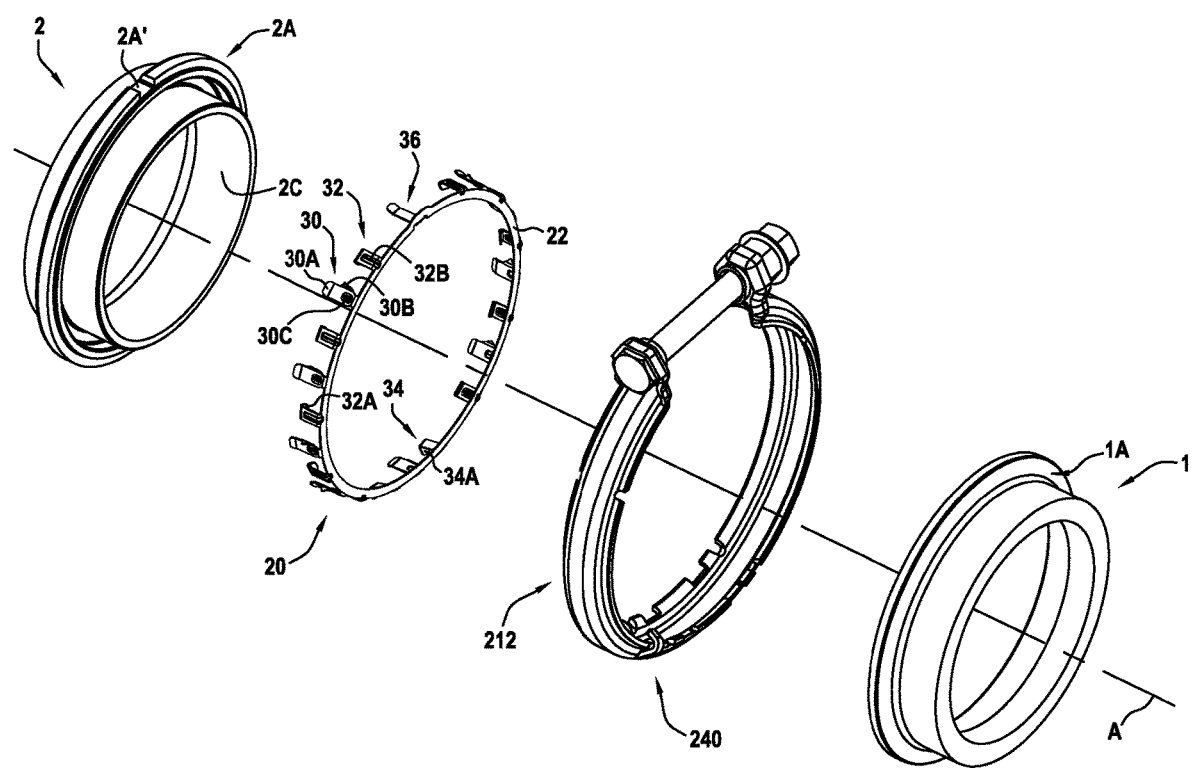

[Fig. 13]
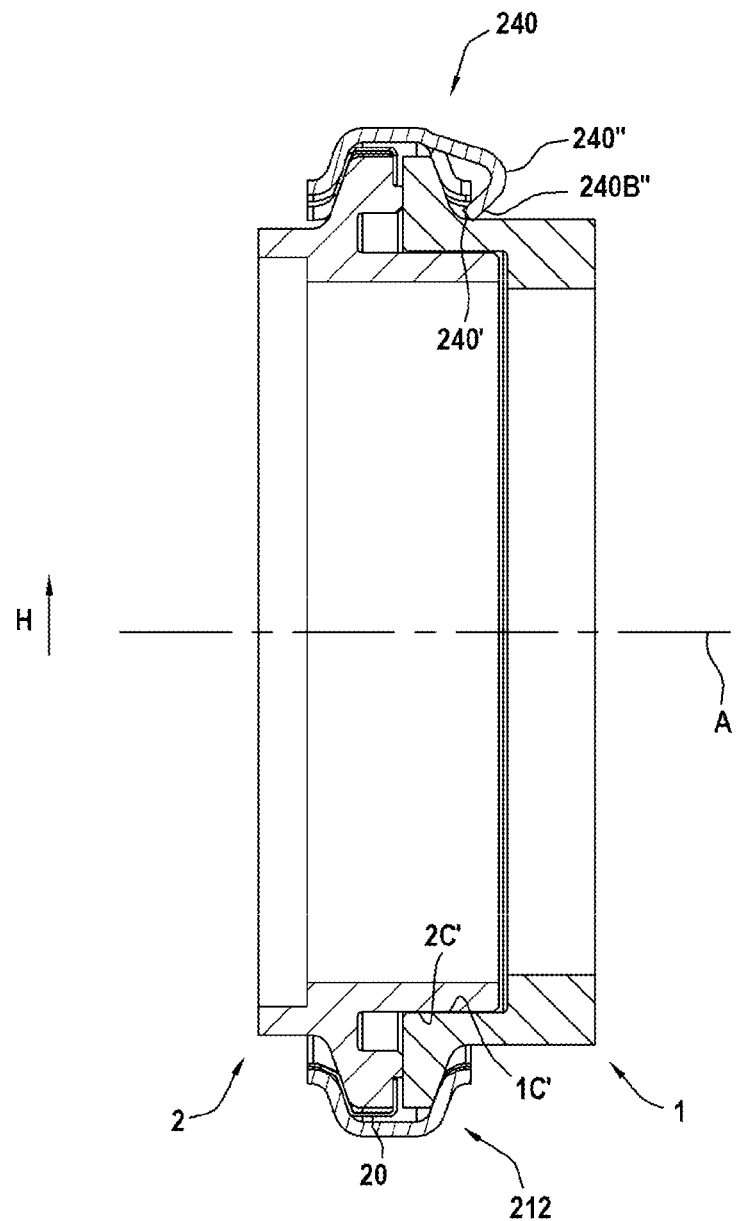

[Fig. 14]
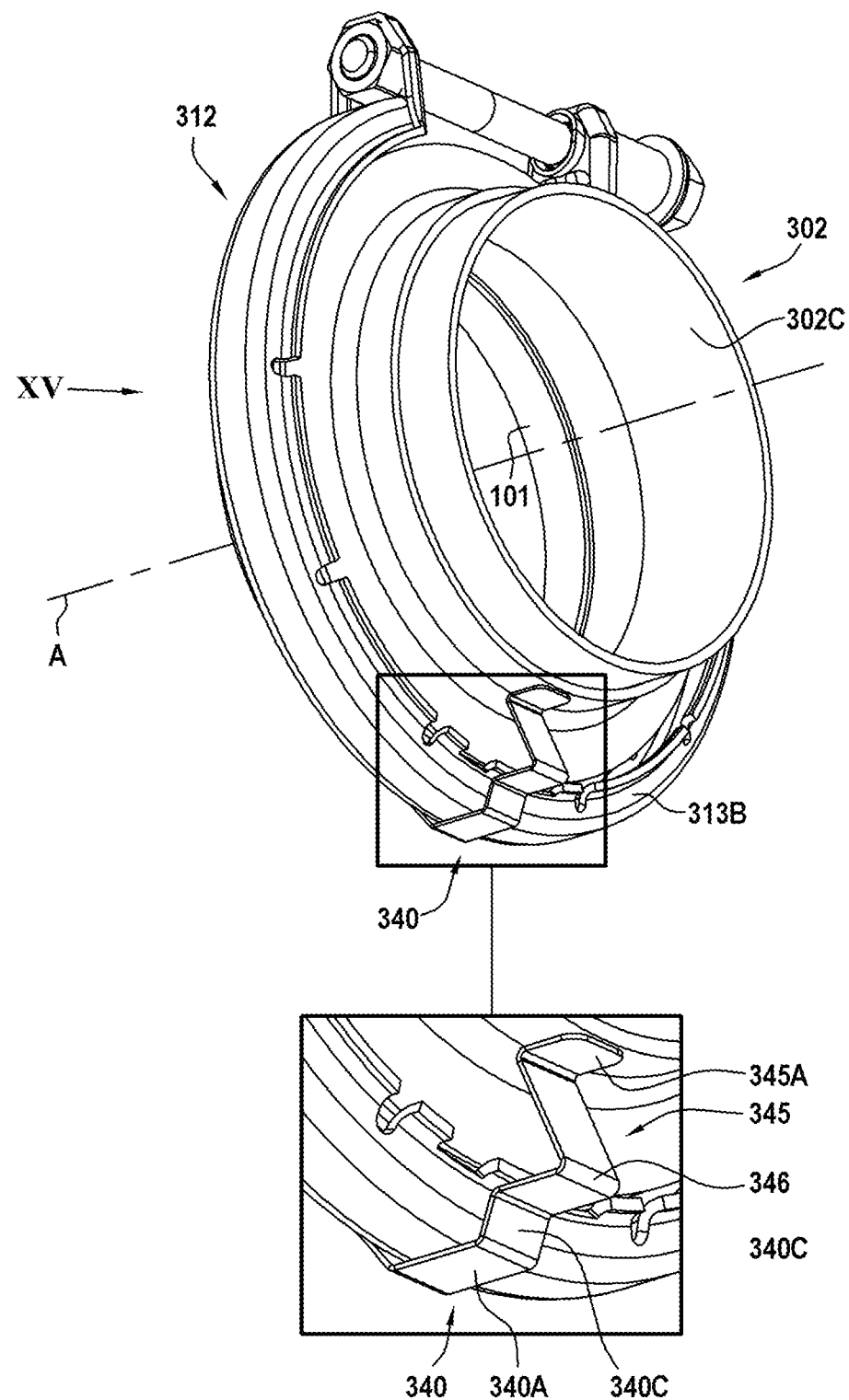

[Fig. 15]
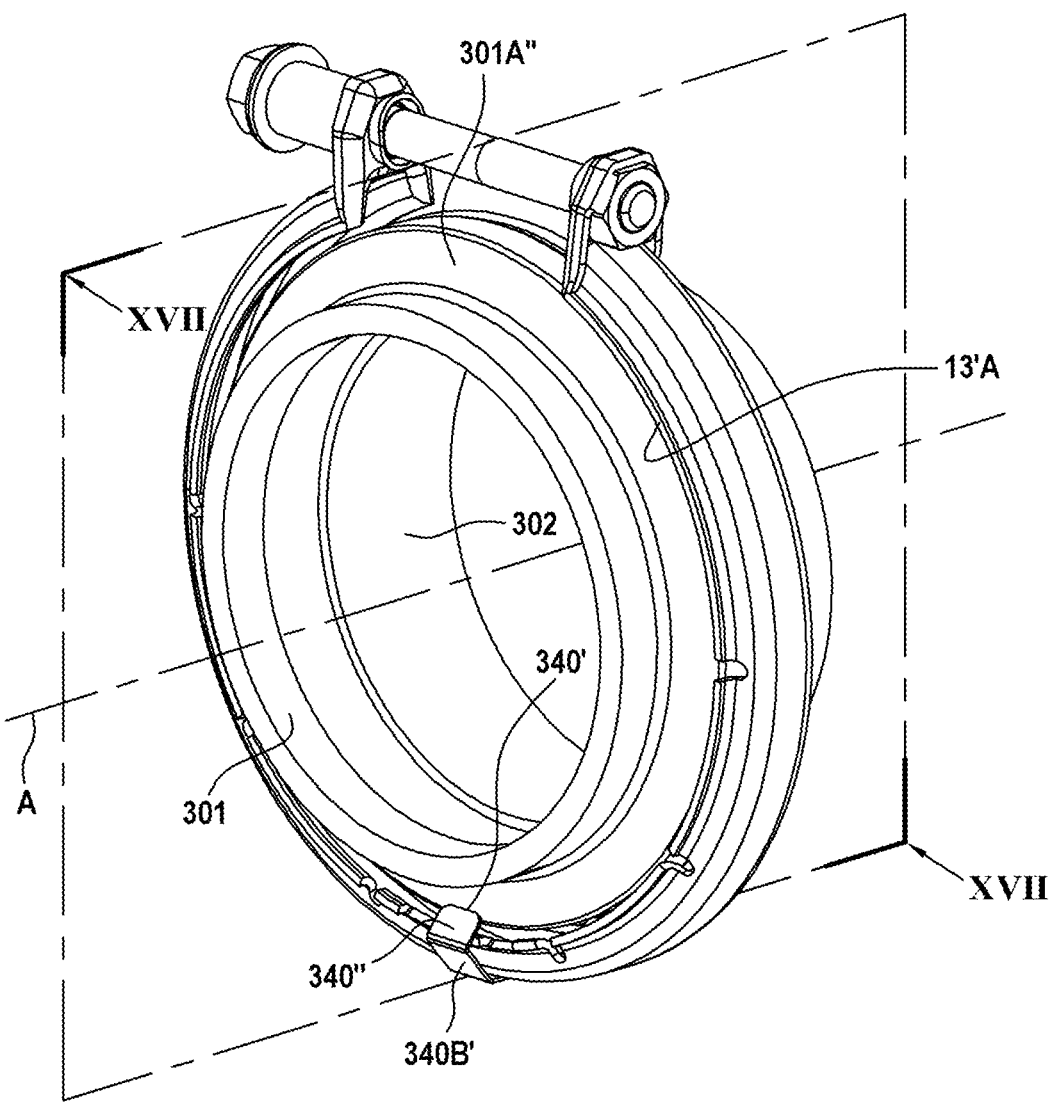

[Fig. 16]
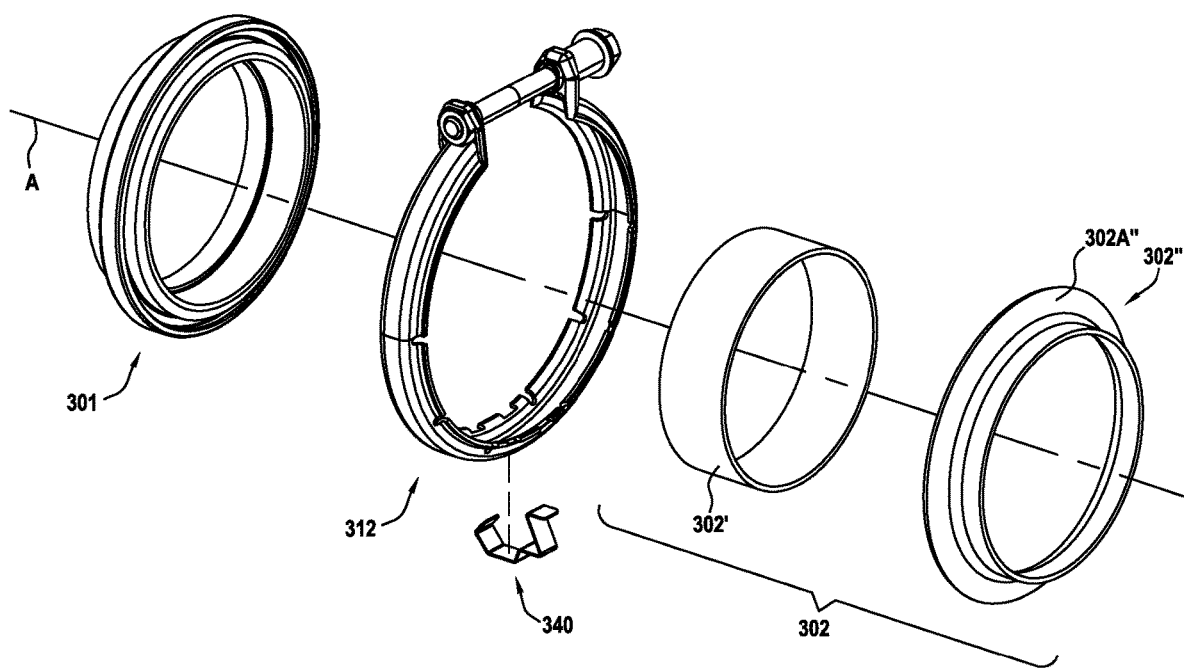

[Fig. 17]
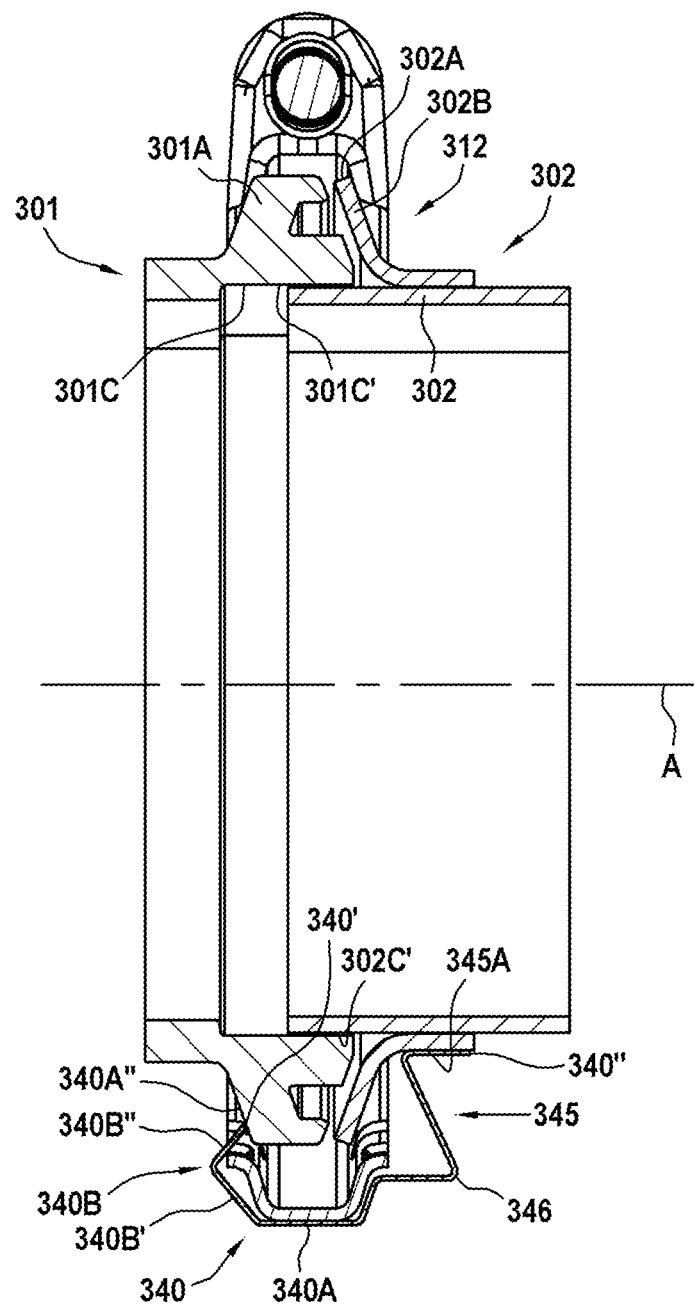

MOUNTING ASSEMBLY INCLUDING TWO END PIECES HELD FITTED BY A BELT

TECHNICAL FIELD

This present disclosure relates to a mounting assembly including two end pieces held fitted by a clamping belt.

The two end pieces have particularly cylindrical shapes allowing their fitting along an axis. The belt can be pre-mounted around the second end piece before the fitting with the first end piece.

BACKGROUND

European patent application No EP 2 598 785 discloses a mounting assembly in which the washer includes first and second pre-mounting means, allowing the retention of the belt on the second end piece in a pre-mounted situation, then the fitting of the two end pieces and the retention of the pre-mounted belt also relative to the first end piece. Thus, the two end pieces can be fitted in a pre-mounted situation, before the belt is clamped to clamp the fitted end pieces.

Patent application No EP 3 217 059 discloses a mounting assembly which includes a plurality of individual clips distributed angularly on the belt for the pre-mounting on one of the end pieces, the belt also being able to be pre-mounted on the other end piece, for example using a washer. Thus, the belt can also be pre-mounted on the second end piece, before the fitting of the two end pieces and the pre-mounting also relative to the first end piece, before the clamping of the belt.

French patent application No 3 098 882 discloses a mounting assembly in which the clamping belt carries retaining loops operating as springs, to allow a pre-mounting on one of the end pieces, the pre-mounting on the other end piece can be performed by a washer. Also in this case, the belt can be pre-mounted on the second end piece, before the fitting of the two end pieces and the pre-mounting also relative to the first end piece, before the clamping of the belt.

SUMMARY

In the mounting assemblies according to the documents presented above, the belt can be pre-mounted on the second end piece, that is to say it is retained relative thereto without being clamped on this second end piece, then the first and second end pieces can be fitted so as to also pre-mount the belt on the first end piece. Thus, the belt is at the same time retained on the two end pieces and can be clamped with little risk of relative displacement of the first and second end pieces. The belt is in itself a relatively light element, and its pre-mounting on the second end piece allows manipulating as a whole the assembly including the second end piece and the belt with a view to pre-mounting this assembly with the first end piece. When the end pieces are not very solid parts, this pre-mounting on each of the two end pieces at the same time effectively allows performing the clamping of the belt without having to hold at the same time the first end piece and the second end piece.

However, the Applicant has found that this solution cannot be satisfactory in some situations. Particularly, one of the two end pieces, called receiver end piece, can be static, by being supported on a support. For example, this receiver end piece is already mounted on a support part. The other end piece, called connected end piece, can then be connected by fitting to the receiver end piece and pre-mounted thereon as previously indicated. In some situations, it may be desirable to leave the end piece connected in a standby situation pre-mounted on the receiver end piece, by completely releasing the connected end piece. This is for example the case when the operator must grasp a tool, or when the assembly, after pre-mounting, must switch to another station of an assembly line. This need to be able to leave the connected end piece pre-mounted by releasing it can be related to safety measures on amounting line, for example an anti-fall safety device.

The Applicant has found that, in some cases, when the connected end piece is relatively heavy and/or has a center of gravity far from the belt and from the pre-mounting means, it may tend to separate from the receiver end piece under the effect of its own weight when it is released.

In general, there are situations in which it is desirable that the pre-mounted situation of the two end pieces is maintained even though at least one of the two end pieces is not supported by a support or a person in charge of the mounting.

The disclosure aims at improving the state of the art by proposing an assembly that limits even more effectively the risks of disassembly of the two end pieces from the pre-mounted fitted configuration.

Thus, the disclosure relates to a mounting assembly including a first end piece having a first end and a second end piece having a second end, said ends being able to be fitted along an axis in a fitted state, the assembly further including a clamping belt configured to be disposed around the second end piece in a pre-mounted configuration in which the unclamped clamping belt is retained axially relative to said second end piece and in which a first edge of said belt delimits an annular opening through which the first end can be engaged for its fitting with the second end, the belt being intended to be clamped on said end pieces in the fitted state, said first and second end pieces having respectively a first and a second centering surface able, in the fitted state, to axially overlap relative to each other and to come into contact in order to limit the relative clearances between said end pieces with respect to the axis, the belt carrying a retaining lug which extends outside the belt on the side of the first edge of the belt and has a free end able to cooperate with a bearing surface of the first end piece so that, the belt being in the pre-mounted configuration and the end pieces being in the fitted state, the end pieces are retained in the fitted state by the combination of the contact of the centering surfaces which are axially overlapping and of the cooperation of the free end of the retaining lug with said bearing surface of the first end piece.

For example, the two end pieces can be sections of tubes of an exhaust line of a combustion engine. More specifically, the second end piece can be a tube segment initially supported by a portion of the exhaust line, and the second end piece can be a tubular portion of a component mounted in the exhaust line, for example a muffler or catalyst portion.

Thus, once the two end pieces are fitted in a pre-mounted situation, they are retained in this situation, on the one hand, by the pre-mounting of the belt on the second end piece and, on the other hand, by the retention of the free end of the retaining lug on the bearing surface of the first end piece. To this retention involving forces which are essentially directed axially, is added a centering retention since the axially overlapping centering surfaces maintain the alignment of the two end pieces. The forces tending to make the two end pieces tilt relative to each other are therefore taken up by the centering surfaces. Under the combined effect of the contact of the centering surfaces and of the retention of the free end on the bearing surface of the first end piece, the two end pieces can be effectively retained in a fitted situation. Thus, if one of the end pieces is a receiver end piece while the other is a connected end piece as indicated above, it is possible to release the connected end piece which then remains in the pre-mounted position. In general, it is possible to release one of the end pieces by simply holding the other so that the assembly remains connected.

The retaining cooperation between the free end of the retaining lug and the bearing surface of the first end piece can be particularly a simple bearing which opposes the axial displacements of the first end piece in the forward direction by moving it apart from the second end piece.

Optionally, the retaining lug is disposed only in a determined angular sector of the belt, the belt optionally carrying a single retaining lug.

Optionally, apart from the predetermined angular sector, the belt has no retaining lug.

Optionally, the predetermined angular sector is less than or equal to 10°, preferably less than or equal to 5°.

Optionally, in the clamped state of the belt, the centering surfaces are axially overlapping over a distance at least equal to 10% of the diameter of the centering surface of the first end piece.

Optionally, one of the first and second end pieces being a male end piece, while the other of the first and second end pieces is a female end piece, the diameter of the centering surface of the female end piece is included within a range between 100% and 105%, preferably between 101% and 103%, of the diameter of the centering surface of the male end piece.

Optionally, the retaining lug has a thickness included within a range between 20% and 100% of the thickness of the belt, preferably between 25% and 50% of the thickness of the belt.

Optionally, the first end piece is a female end piece while the second end piece is a male end piece, and, in the pre-mounted configuration of the belt, an annular accommodation space for the first end is arranged radially between the first edge of the belt and an external peripheral surface of the second end.

Optionally, the bearing surface of the first end piece is formed on a first annular protrusion of said first end piece.

Optionally, the second end piece has a second annular protrusion around which the belt is disposed.

Optionally, the retaining lug is fixed to the second end piece.

Optionally, the retaining lug is welded on the belt, particularly on a flat section of the belt.

Optionally, the retaining lug is fastened on the belt, the retaining lug optionally carrying a fastening tab which passes through a drilling in the belt.

Optionally, the retaining lug is formed in one piece with at least one section of the belt, by being optionally cut out in said section.

Optionally, the receiver end piece and the mounting part each have a radially protruding surface, and the belt has an annular recess configured to accommodate said radially protruding surfaces.

Optionally, in the free state, the free end of the retaining lug is located axially and radially under the first edge of the belt.

The retaining lug can be dimensioned to effectively contribute to the retention of the two end pieces relative to each other. Particularly, the lug can be relatively rigid due for example to its thickness. However, it is appropriate not only that the lug contributes to the retention of the two end pieces in the pre-mounted fitted situation, but also that it does not interfere with the clamping of the belt. During this clamping, the diameter of the belt is reduced so as to bring the belt radially closer to the bearing surface of the first end piece. The retaining lug should be prevented from opposing this approximation. In this regard, the fact that the retaining lug is disposed only in a determined angular sector, or is a single retaining lug, facilitates the clamping of the collar. Particularly, the deformations of the retaining lug necessary for an effective clamping are easier to control when this lug is present only in a determined limited angular sector and a fortiori when it is a single lug. Similarly, by providing for a lug present only on the determined angular sector or a single lug, the fitting of the tubes can be facilitated. Particularly, the free end of the lug can form a kind of obstacle on the fitting path of the first end piece relative to the second end piece, this obstacle particularly tends to oppose the passage of the bearing surface of the first end piece. However, if the retaining lug is present only on a limited angular sector, it is easier either to cause its slight deformation during the fitting, or to start the fitting by placing the two end pieces slightly at an angle relative to each other to ensure that the free end of the lug is artificially moved apart from the bearing surface of the first end piece. The determined angular sector can be disposed in the upper portion of the assembly, the retaining lug then opposing the tendency of the upper portions of the end pieces to move apart.

BRIEF DESCRIPTION OF THE DRAWINGS

Other characteristics and advantages of the object of the present disclosure will emerge from the following description of embodiments, given by way of non-limiting examples, with reference to the appended figures.

FIG. 1 shows, in perspective, the second end piece and the belt of a mounting assembly according to a first embodiment, in the pre-mounted position of the belt on the second end piece.

FIG. 2 is a perspective view of the pre-mounting assembly according to the first embodiment, showing the situation in which the two end pieces are fitted and the belt is pre-mounted on the two fitted end pieces.

FIG. 3 is a perspective view, taken along the arrow III of FIG. 2.

FIG. 4 is an exploded perspective showing the different elements of the mounting assembly of FIGS. 2 and 3.

FIG. 5 is an axial sectional view, in the plane V-V of FIG. 3, showing the two end pieces held in a pre-mounting situation using the belt which is pre-mounted in an unclamped manner.

FIG. 6 is an axial sectional view, showing the two end pieces held and clamped with the belt which is clamped.

FIG. 7 is a view similar to FIG. 2, for a second embodiment.

FIG. 8 is a view of the assembly of FIG. 7 according to the arrow VIII of FIG. 7.

FIG. 9 is an exploded perspective view showing the different elements of the assembly of FIGS. 7 and 8.

FIG. 10 shows the assembly of FIGS. 7 to 9 in axial cross-section in the plane X-X of FIG. 8, the end pieces being held fitted and clamped by the belt.

FIG. 11 is a view similar to FIGS. 2 and 7, for a third embodiment.

FIG. 12 is an exploded perspective view of the assembly of FIG. 11.

FIG. 13 shows the assembly of FIGS. 11 and 12 in axial cross-section in the plane XIII-XIII of FIG. 11, the end pieces being held fitted and clamped by the belt.

FIG. 14 shows, in perspective, a mounting assembly according to a fourth embodiment, the clamping belt being pre-mounted on the end pieces and the view being taken from the side of the second end piece.

FIG. 15 is a perspective view along the arrow XV of FIG. 14, showing the assembly from the side of the first end piece.

FIG. 16 is an exploded perspective view of the mounting assembly of FIGS. 14 et 15.

FIG. 17 is an axial sectional view in the plane XVII of FIG. 15.

DETAILED DESCRIPTION

The assembly shown in FIGS. 2 and 3 includes a first and a second end piece 1 and 2 which are here represented partially. Indeed, it is practically seen from these end pieces 1 and 2 only their respective ends 1A and 2A which are fitted into each other along the axis A.

As can also be seen in FIG. 1, the mounting assembly further includes a clamping belt 12 which forms part of a clamping collar 10. In this case, the belt 12 has ends respectively 12A and 12B which are straightened radially so as to form bearing lugs. These lugs include holes formed to allow the passage of the rod 14A of a clamping screw 14 through these lugs. The head 14B of the clamping screw is set relative to one of the bearing lugs, in this case the lug 12B, while a nut 16 is retained relative to the other bearing lug 12A. It is understood that the rotation of the nut in the screwing direction brings the bearing lugs closer to each other and therefore clamps the belt by reducing its diameter. Of course, other ways of clamping the belt can be envisaged, for example hooking systems as described in particular in patent application FR 3 008 160.

In the present disclosure, reference is made to the axis A, which is at the same time the fitting axis of the end pieces, the axis of the belt 12 and the axis of the end pieces 1 and 2 when they are fitted and aligned. Indeed, these end pieces generally have a cylindrical shape whose axis A is the axis of revolution. It may particularly be tubes or sections of tubes. "Radially internal" will further refer to the elements which are directed towards the axis A, and which are closest to this axis A relative to other elements referred to as "radially external", the "radially external" elements also being those which are directed away from the axis A. Furthermore, a second element will be considered as "external" or "axially external" to a first element if the second element is located next to the first one that is to say outside the axial slice occupied by the first element. It will also be considered that a second element is located under a first element when it is in the same axial slice as this first element while being closer to the axis A, that is to say radially internal relative to this first element. Furthermore, with regard to a portion of the first end piece 1, the forward direction FA1 (FIG. 5) is the direction towards the second end piece that is to say the direction of its fitting with the second end piece, the opposite direction RA1 being the backward direction. Conversely, with regard to a portion of the second end piece, the directions FA1 and RA1 are on the contrary the backward direction and the forward direction, respectively.

In FIG. 1, the clamping belt 12 is disposed around the second end piece 2, more specifically around the end 2A of this end piece, in a pre-mounted configuration in which this belt is axially retained relative to the second end piece. This pre-mounting in this case is performed using a washer 20 which is better visible in FIG. 4. The washer may be particularly of the type described in EP 1 451 498. This washer 20 is carried by the belt 12 and has an annular section 22 which can be inserted between the ends facing the end pieces 1 and 2 when they are fitted while being held by the belt.

In the pre-mounted state of the belt 12 on the second end piece 2 represented in FIG. 5, as well as in the clamped state represented in FIG. 6, the annular portion 22 of the washer 20 is located between two facing surfaces, respectively 1A' and 2A' of the ends 1A, respectively 2A, of the end pieces 1 and 2.

In this case, in the example represented, the washer does not specifically have a sealing function. In the clamped state represented in FIG. 6, the annular section 22 is in fact housed in a step of the surface 2A' of the end piece 2 which leaves an annular space between this surface 2A' and the surface 1A' of the end piece 1. It can however be provided that this step is not made, in which case the annular section 22 of the washer could be pinched between the surfaces facing the end pieces and could, where appropriate, contribute to the sealing of the connection between the end pieces.

In this case, the washer 20 is used to perform the retention in the pre-mounted configuration of the clamping belt 12 around the second end piece 2. To this end, this washer 20 has a series of fixing lugs and pre-mounting lugs, for example of the type described in EP 1 451 498, which is used on the one hand to retain this washer relative to the belt 12 and, on the other hand, to also retain it on a bearing surface of the end 2A of the end piece 2. More specifically, the end 2A of the end piece 2 has an annular protrusion 2B which forms a bead whose rear surface 2A" forms a bearing surface.

It is also noted that the end 1A of the first end piece 1 has an annular protrusion, whose rear surface 1A" forms a bearing surface.

In this case, the belt delimits a recess 13 in which the annular protrusion 2B of the end 2A of the end piece 2 and the annular protrusion 1A formed at the end of the end piece 1 are housed when the end pieces are fitted, as seen in particular in FIGS. 5 and 6.

The recess 13 is delimited between a first and a second flank 13A, 13B of the belt 12. These flanks are generally oriented radially, while slightly moving apart from each other as they get closer to the axis A. Similarly, the bearing surfaces 1A" and 2A" formed on the rear faces of the annular protrusions 1A and 2A of the respective end pieces 1 and 2 slightly get closer to each other as they get away from the axis A. Thus, it is understood that the clamping of the belt tends to bring the end pieces closer to each other in order to press their facing front faces 1A' and 2A' against each other.

In this case, as has been indicated, the washer 22 is used to perform the pre-mounting of the belt at the end 2A of the end piece 2. For this purpose, as can be seen in particular in FIG. 4, the washer 20 carries pre-mounting lugs. In the example represented, several types of pre-mounting lugs are provided.

Indeed, the washer 20 carries, on the one hand, pre-mounting lugs 30 which have ends 30A slightly bent outwardly to be able to hook onto the edge 13B' of the flank 13B of the belt. The lugs 30 also have, on their longitudinal edges, wings 30B folded outwardly and of substantially triangular shape in order to be able to hook by their tips on the internal periphery of the flank 13B of the belt. These lugs 30 can be rigidified by bosses 30C formed in their middle sections. It is understood that the pre-mounting lugs 30 is therefore used to retain the washer 20 relative to the belt 12.

The pre-mounting lugs also include lugs 32 whose ends 32A are bent radially inwardly to be able to hook onto the bearing surface 2A" of the end 2A of the end piece 2. These lugs 32 may also have bosses 32B in their middle regions to be rigidified. The lugs 32 is therefore used for the retention relative to the end piece 2.

In this case, the pre-mounting lugs also include lugs 34, generally similar to the lugs 30A, but whose ends 34A are longer than the ends 30A and are further folded so as to be practically oriented radially to be retained against the external surface of the flank 13B of the belt. These lugs 34A can also cooperate with notches 13C formed on the edge of the flank 13B, so as to be used for the angular setting of the washer 20 relative to the belt. In the same spirit, the washer may have one or several angular setting lugs 36 generally oriented axially, to be positioned in a notch 2'A of the bead 2A of the end piece 2 so as to angularly set the washer relative to this end piece. Thus, in a pre-mounted situation, the assembly of the belt and of the washer is set angularly relative to the end piece 2 while being axially retained thereon.

The support lugs of the washer may vary relative to what has just been described, and for example be similar to those represented in patent EP 1 451 498, or in the French patent application filed under number FR 20 03382.

It should be noted here that the collar 10 could be retained in a pre-mounted position relative to the end piece 2 in another way. For example, this collar could carry one or several external hooking lugs hooking onto one or several hooking surfaces of the end piece 2. Even if it is advantageous for the belt 12 to have an internal recess, it could be replaced by a flat belt.

In FIG. 1, the belt 12 is pre-mounted on the end piece 2, and it can be seen that the edge 13A' of its flank 13A delimits an annular opening through which the end of the first end piece 1 can be inserted. In this case, at its end 2A, the end piece 2 has an internal cylindrical skirt 2C located radially under an annular protrusion 2B and extending axially forwardly, that is to say towards the end piece 1, beyond the front face 2A' of this annular protrusion 2B. Thus, as seen in FIG. 1, this skirt 2C extends radially under the edge 13A' of the belt, and even further forwardly relative to this edge.

An annular accommodation space E for the end of the first end piece is however arranged radially between an external peripheral surface of the end of the end piece 2 (this external peripheral surface being in this case the external surface of the cylindrical skirt 2C) and the internal periphery of the belt (in this case, the first edge 13A' of the belt). In this case, an annular groove 2D is delimited between the external periphery of the annular skirt 2C and an internal annular surface of the annular protrusion 2B. This groove 2D can receive an annular seal.

As seen particularly in FIGS. 5 and 6, the end pieces 1 and 2 have centering surfaces. In this case, the centering surface of the end piece 2 is formed at the external periphery 2C' of the annular skirt 2C mentioned above. With regard to the end piece 1, the latter has, on its internal periphery, a centering surface 1C' combined with the centering surface 2C'. In this case, the internal surface of the end 1A of the end piece 1 has an annular step 1C in which the skirt 2C is received in the fitted state of the end pieces. The centering surface 1C' of the first end piece 1 is formed by the axially oriented annular bottom of this recess 1C'. Thus, from the fitting point of view, the end piece 1 forms a female part, while the end piece 2 forms a male part. The centering surfaces are cylindrical surfaces of revolution about the axis A.

In the fitted and clamped state represented in FIG. 6, the centering surfaces 1C' and 2C' are axially overlapping over a length RA at least equal to 10% of the diameter DC1 of the centering surface 1C' of the first end piece 1. For example, the length RA can be included within a range between 10% and 30%, more particularly between 15% and 25%, of the diameter DC1. This allows making a fitting and interlocking connection over a sufficient length.

As indicated, in this case, the first end piece 1 is a female end piece, while the second end piece 2 is a male end piece, that is to say the centering surface 1C' of the first end piece 1 receives thereinside the centering surface 2C' of the second end piece 2. The diameter DC1 of the centering surface 1C' of the female end piece 1 is included within a range between 100% and 105%, preferably between 101% and 103% of the diameter DC2 of the centering surface 2C' of the male end piece 2.

Furthermore, the belt 10 carries a retaining lug 40 which, in the pre-mounted fitted state, is used to retain the first end piece 1 relative to the belt. FIG. 1 shows this lug 40 in the free state that is to say before it cooperates with the end piece 1. This lug 40 is generally located outside the belt 12 and we see that, in this free state, it extends from the outside of this belt up to a free end 40' which is in this case located axially and radially under the first edge 13A' of the belt. In this case, the lug 40 has an axial portion 40A for attachment to the external periphery of the belt, and a bent portion 40B which forms a sort of a hook portion. This hook portion 40B is folded radially inwardly beyond the flank 13A of the belt and extends from the external side of this flank 13A. This portion 40B has itself a first section 40B' attached to the end of the axial portion 40A and folded towards the axis A while slightly moving away from the flank 13A, followed by a second portion 40B" which, from a top 40", is axially folded inwardly up to the free end 40'.

In FIG. 5, which shows the assembly in the pre-mounted state, the two end pieces being fitted but the belt not being clamped, it can be seen that the centering surfaces 1C' and 2C' are facing each other and are in contact on at least one portion of these surfaces. The respective axes of the two end pieces are represented merged with the axis A, which is an ideal case in which the end pieces are perfectly centered. Given the small dimensional deviations between the diameters of the centering surfaces, these surfaces are in practice in contact on sections of these surfaces. For example, if the direction H indicated in FIG. 5 is the upward direction, under the effect of gravity, the end pieces may tend to slightly move apart from each other in the region of their upper portions, in which is in this case the position of the retaining lug 40. In this case, the centering surfaces are in contact in the lower region, while they can be very slightly apart from each other in the upper region, and the retention performed by the retaining lug goes against such a deviation.

On the other hand, the free end 40' of the retaining lug 40 bears on the bearing surface 1A" of the end piece 1. Thus, in the region of this lug, the faces facing the ends of the end pieces therefore tend to remain in contact with each other. This bearing of the retaining lug, combined with the cooperation of the centering surfaces therebetween, prevents a disengagement of the end pieces and therefore maintains the pre-mounted fitted state represented in FIG. 5.

FIG. 6 shows the situation in the clamped state, and it is seen that the lug 40 has deformed so as to accompany the reduction in the diameter of the belt caused by the clamping, and that this belt has pressed one against the other the faces facing the ends of the end pieces 1 and 2.

It is seen that the retaining lug 40 is disposed only in a determined angular sector β of the belt 12. In this case, a single retaining lug 40 is provided. Generally, it is interesting for the retaining lug to cover only one angular sector less than or equal to 10 degrees, preferably less than or equal to 5 degrees. This has several advantages.

On the one hand, it is possible to perform an effective retention with a single retaining lug or in any case with retaining lugs extending only in a limited area and therefore being able to be made or fixed easily with a simple tool. On the other hand, the fact that the retaining lug is only present in the limited angular sector β allows facilitating the fitting of the end pieces from the pre-mounted situation of the belt on the end piece 2 represented in FIG. 1. Indeed, as such, the free end 40' of the retaining lug 40 forms, in the annular space E, an obstacle to bringing the end 1A of the end piece 1 into this annular space until the retaining cooperation between this free end and the bearing surface 1A" of the first end piece 1. However, the belt then being in the unclamped state, the diametrical dimensions of the annular space are sufficient to allow the passage of the first end 1A under the first edge 13A' of the belt. It is therefore possible to exploit this double phenomenon by bringing the end 1A very slightly obliquely so as to pass the obstacle represented by the end 40' of the retaining lug, thus bringing the free end into contact with the bearing surface 1A", before completely straightening the end piece 1 to align its axis with the axis A, possibly by operating for this purpose a slight backward movement of the end piece 1 relative to the belt 12 thus causing a controlled deformation of the free end 40' of the retaining lug 40 in rearward direction.

Referring to FIGS. 5 and 6, it is seen that the thickness EP of the retaining lug is on the order of 30% of the thickness EC of the belt 12. Generally, the thickness of the retaining lug 40 is included within a range between 20% and 100% of the thickness of the belt, preferably between 25% and 50% of this thickness. The lug can be made of the same material as the belt, for example metal, for example stainless steel, particularly austenitic stainless steel.

This allows giving the lug a relative rigidity, comparable to that of the belt while being lower, while allowing it to elastically deform during the clamping of the belt. Due to this relative rigidity, the retaining lug performs an effective retention on the bearing surface 1A" of the end piece 1, even though this lug is present only in a limited determined angular sector, or is a single lug.

By comparing FIGS. 5 and 6, it is seen that the retaining lug 40 has been deformed due to the clamping of the belt. However, this lug being relatively rigid, its free end 40' bears against the external periphery of the first end piece 1. This forced bearing avoids the vibrations of the lug on the first end piece in the condition of use of the end pieces, these end pieces being particularly able to be embedded on a machine or a vehicle.

As indicated, the bearing surface 1A" of the first end piece is formed on a protrusion of this first end piece 1. This protrusion is in this case an annular protrusion, forming a bead at the end 1A of the first end piece, this bead being received in the recess 13 of the belt 12.

The retaining lug 40 can be welded to the belt. This weld can be particularly performed in the axial portion 40A of this lug in contact with a surface of the axially oriented belt. In this case, as indicated, the belt has an internal recess 13. In addition to the flanks 13A and 13B indicated, this recess has a bottom 13D which, on the external side of the belt, forms an axial annular section 13D'. It is on this axial annular section which forms a kind of flat section, that the portion 40A of the lug 40 is welded. The belt 12 in this case has a generally U-shaped cross-section whose branches are slightly apart or curved while getting closer to the axial direction at their free ends. On its side opposite to its free end 40', the lug 40 may have a flap 40C folded against the external surface of the flank 13B of the belt. This favors the holding of the lug 40.

With reference to FIGS. 7 to 10, a second embodiment of the mounting assembly will now be described. In this second embodiment, the retaining lug 140 and the belt 112 slightly differ from the retaining lug 40 and from the belt 12 of the first embodiment. In addition, the washer 20 is not implemented here, although it could be, for example to ensure a sealing function. In its other aspects, the second embodiment is identical to the first one, and the reference numerals are unchanged for these other aspects.

In this second embodiment, the retaining lug 140 is fastened on the belt 112. In this case, this retaining lug 140 is a double lug which includes two hook portions respectively 140B and 142B generally similar to the hook portion 40B of the retaining lug 40 of the first embodiment. The hook portion 140B is disposed on the side of the first flank 13A of the belt, while the hook portion 142B is disposed on the side of the second flank 13B. Each of these hook portions 140B and 142B has a first section, respectively 140B' and 142B' which, from an axial middle portion 140A of the lug 140, extends outside the considered flank, respectively 13A and 13B. These two sections 140B' and 142B' slightly moving apart from each other from the middle section 140A. From a respective top of these first portions, respectively 140" and 142", the hook portions have an end portion, respectively 140B" and 142B", which are bent inwardly of the belt as they get closer to the axis A. The free ends, respectively 140' and 142' of these hook portions are, in the free state, located radially and axially under the edges of the considered flanks, respectively 13A and 13B. Thus, once fastened on the belt, the retaining lug 140 is naturally retained relative to the latter by the hook portions.

Furthermore, the retaining lug 140 has a fastening tab 144 which passes through a drilling 112' in the belt 112. This tab 144 thus allows axially setting the fastener, and therefore the belt, against the front edge of the end piece 2 on which the retaining lug 140 is initially pre-mounted. The fastening tab 144 can also be used for the setting of the fastener along the circumferential direction of the belt.

In the pre-mounted state and in the clamped state, shown in FIG. 10, this fastening tab can be located between the faces facing the ends of the end pieces 1 and 2, one of these faces possibly being provided with a notch for this purpose. This tab can therefore be used as an angular setting of the belt relative to the end pieces in addition to the axial setting mentioned above. Thus, the free end 142' of the retaining lug 140 is used for the retention in the pre-mounted state of the belt relative to the second end piece 2, the washer 20 of the first embodiment being possibly absent. Similarly, the free end 140' is used for the pre-mounted retention relative to the first end piece 1, as for the free end 40' of the retaining lug of the first embodiment.

The fastening tab 144 can be formed by a cutout 143 in the retaining lug, this cutout section being folded inwardly from the axial middle portion 140A, so as to be oriented substantially radially.

Like the retaining lug 40 of the first embodiment, the retaining lug 140 may be present within a limited defined angular sector and be even a single lug. Its thickness can be on the same order as mentioned above.

Referring to FIGS. 11 to 13, a third embodiment will now be described, which differs from the first one only by the configuration of the retaining lug which is directly integrally formed with the belt. Thus, in FIGS. 11 to 13, the same numerical references as those of FIGS. 1 to 6 are used, except for the belt, which is here referenced 212 and for the retaining lug which is here referenced 240. It is in particular seen in FIG. 12 that the washer 20 is also present and similar to that of the previous figures. It is used for the pre-mounting of the belt on the second end piece 2. With regard to the pre-mounting on the first end piece 1, the belt has the retaining lug 240 which is formed in one piece therewith. As seen, this retaining lug 240 is cut out into the belt and is straightened relative to the edge of the cutout 215. The retaining lug 240 is slightly straightened relative to the flank 13A up to a bend 240" from which it is bent as a hook according to a hook head section 240B", up to a free end 240' which, in the free state, protrudes radially and axially under the edge 13A' of the flank 13A. Being integrally formed with the belt, this retaining lug 240 has in principle a thickness identical to that of the belt. It is therefore relatively rigid. It can therefore deform, particularly by pivoting around its attachment area 241 with the belt, this area being preferably located in the axial annular portion 13D' of the belt which forms the external face of the bottom 13D of the recess 13. Of course, as can be seen in FIG. 13, the axial centering surfaces are present as in the first and second embodiments. Thus, the pre-mounting is performed, on the one hand, by the washer 20 which cooperates with the second end piece 2 and, on the other hand, by the retaining lug 240 which cooperates with the first end piece 1 and the centering surfaces of the end pieces.

With reference to FIGS. 14 to 17, a fourth embodiment of the mounting assembly is now described. The same numerical references as in FIGS. 1 to 6, increased by 300, are used to refer to the corresponding elements.

In FIGS. 14 and 15, the clamping belt 312, which is identical to that of the first embodiment, is disposed around the second end piece 302 while being retained in a pre-mounted configuration on this end piece. This pre-mounting is in this case performed by a lug 340 which is also used as a retaining lug. Indeed, the third embodiment differs only from the first one by the confirmation of the rear portion of the retaining lug, which allows using this lug to retain the belt in the pre-mounted state on the second end piece.

The retaining lug 340 has a rear portion 345, which extends radially above the second end piece 302 and is fixed to the latter. More specifically, the lug 340 has an axial portion 340A for attachment to the external periphery of the fixing belt and a free end 340' able to cooperate with the bearing surface 301A" formed at the end 301A of the first end piece. 301. The rear portion 345 extends opposite the free end 340'. This rear portion 345 has a corrugation 346 which is therefore located between the attachment portion 340A and the free end 340" of the lug 340 opposite the free end 340'. This corrugation 346 is radially protruding relative to the end section 345A of the rear portion 345 by which the fixing with the second end piece 302 is made. This corrugation gives the rear portion 345 of the lug 340 the ability to radially deform during the clamping of the belt, without damaging the fixing of the lug 340 to the belt and to the second end piece. Indeed, during the clamping of the belt, the axial portion 340A gets closer to the axis A and the corrugation 346 closes slightly to accompany this approximation. Between the attachment portion 340A and the corrugation 346, the rear portion 345 has a flap 340C folded against the outer surface of the flank 313B of the belt 312, which favors the holding of the lug 340. Moreover, this flap can also be used for fixing the lug to the belt. The lug 340 can be fixed to the belt 312 by any appropriate means, particularly by welding, clinching, hooking or clipping. The end section 345A of the rear portion 345 of the lug can be fixed to the second end piece 302 by any appropriate means. This fixing can for example be made by welding, therefore without additional parts. However, it can be made using an additional part, such as an attachment collar added around the end section 345A.

In its front portion, extending from the axial portion 340A to the free end 340', the lug 340 is similar to the lug 40 of the first embodiment. The bent portion 340B is thus recognized with its first and second sections 340B' and 340B".

The end pieces 301 and 302 have centering surfaces 301C' and 302C', generally similar to the centering surfaces 1C' and 2C' of the first embodiment. As can be seen in FIG. 17, these centering surfaces are axially overlapping in the pre-mounted situation of the end pieces with the belt. In this case, the second end piece 302 is made in two pieces and includes a cylindrical tube 302' on which a flange 302" which carries the end 302A of the second end piece is added, this end forming a radial annular protrusion 302B which has the bearing surface 302A". Of course, the second end piece could however be made differently, for example in one piece.

The invention claimed is:

1. A mounting assembly comprising a first end piece having a first end and a second end piece having a second end, said ends being able to be fitted along an axis in a fitted state, the assembly further comprising a clamping belt configured to be disposed around the second end piece in a pre-mounted configuration in which the unclamped clamping belt is retained axially relative to said second end piece and in which a first edge of said belt delimits an annular opening through which the first end can be engaged for its fitting with the second end, the belt being intended to be clamped on said end pieces in the fitted state, said first and second end pieces having respectively a first and a second centering surface able, in the fitted state, to axially overlap relative to each other and to come into contact in order to limit the relative clearances between said end pieces with respect to the axis, the belt carrying a single retaining lug which extends outside the belt on the side of the first edge of the belt and has a free end able to cooperate with a bearing surface of the first end piece so that, the belt being in the pre-mounted configuration and the end pieces being in the fitted state, the end pieces are retained in the fitted state by the combination of the contact of the centering surfaces which are axially overlapping and of the cooperation of the free end of the retaining lug with said bearing surface of the first end piece.

2. The assembly according to claim 1, wherein the retaining lug is provided in an angular sector of the belt which covers no more than 10°, no retaining lug being provided in any sector of the belt other than said angular sector.

3. The assembly according to claim 1, wherein, in the clamped state of the belt, the centering surfaces are axially overlapping over a length at least equal to 5% of the diameter of the centering surface of the first end piece.

4. The assembly according to claim 1, wherein one of the first and second end pieces being a male end piece, while the other of the first and second end pieces is a female end piece, the diameter of the centering surface of the female end piece is comprised between 100% and 105% of the diameter of the centering surface of the male end piece.

5. The assembly according to claim 1, wherein the retaining lug has a thickness comprised between 20% and 100% of the thickness of the belt.

6. The assembly according to claim 1, wherein the first end piece is a female end piece while the second end piece is a male end piece, and wherein, in the pre-mounted configuration of the belt, an annular accommodation space for the first end is arranged radially between the first edge of the belt and an external peripheral surface of the second end.

7. The assembly according to claim 1, wherein the bearing surface of the first end piece is formed on a first annular protrusion of said first end piece.

8. The assembly according to claim 1, wherein the second end piece has a second annular protrusion around which the belt is disposed.

9. The assembly according to claim 1, wherein the retaining lug is fixed to the second end piece.

10. The assembly according to claim 1, wherein the retaining lug is welded on the belt.

11. The assembly according to claim 1, wherein the retaining lug is fastened on the belt.

12. The assembly according to claim 11, wherein the retaining lug comprises a fastening tab which passes through a drilling in the belt.

13. The assembly according to claim 1, wherein the retaining lug is formed in one piece with at least one section of the belt.

14. The assembly according to claim 1, wherein the first and the second end piece each have a radially protruding surface, and the belt has an annular recess configured to accommodate said radially protruding surfaces.

15. The assembly according to claim 1, wherein, in the free state, the free end of the retaining lug is located axially and radially under the first edge of the belt.

16. A mounting assembly comprising a first end piece having a first end and a second end piece having a second end, said ends being able to be fitted along an axis in a fitted state, the assembly further comprising a clamping belt configured to be disposed around the second end piece in a pre-mounted configuration in which the unclamped clamping belt is retained axially relative to said second end piece and in which a first edge of said belt delimits an annular opening through which the first end can be engaged for its fitting with the second end, the belt being intended to be clamped on said end pieces in the fitted state, said first and second end pieces having respectively a first and a second centering surface able, in the fitted state, to axially overlap relative to each other and to come into contact in order to limit the relative clearances between said end pieces with respect to the axis, the belt carrying a retaining lug which extends outside the belt on the side of the first edge of the belt and has a free end able to cooperate with a bearing surface of the first end piece so that, the belt being in the pre—mounted configuration and the end pieces being in the fitted state, the end pieces are retained in the fitted state by the combination of the contact of the centering surfaces which are axially overlapping and of the cooperation of the free end of the retaining lug with said bearing surface of the first end piece, the retaining lug being provided in an angular sector of the belt which covers no more than 10°, no retaining lug being provided in any sector of the belt other than said angular sector.

17. A mounting assembly comprising a first end piece having a first end and a second end piece having a second end, said ends being able to be fitted along an axis in a fitted state, the assembly further comprising a clamping belt configured to be disposed around the second end piece in a pre-mounted configuration in which the unclamped clamping belt is retained axially relative to said second end piece and in which a first edge of said belt delimits an annular opening through which the first end can be engaged for its fitting with the second end, the belt being intended to be clamped on said end pieces in the fitted state, said first and second end pieces having respectively a first and a second centering surface able, in the fitted state, to axially overlap relative to each other and to come into contact in order to limit the relative clearances between said end pieces with respect to the axis, the belt carrying a retaining lug which extends outside the belt on the side of the first edge of the belt and has a free end able to cooperate with a bearing surface of the first end piece so that, the belt being in the pre-mounted configuration and the end pieces being in the fitted state, the end pieces are retained in the fitted state by the combination of the contact of the centering surfaces which are axially overlapping and of the cooperation of the free end of the retaining lug with said bearing surface of the first end piece, wherein the second end piece has a second annular protrusion around which the belt is disposed.

18. A mounting assembly comprising a first end piece having a first end and a second end piece having a second end, said ends being able to be fitted along an axis in a fitted state, the assembly further comprising a clamping belt configured to be disposed around the second end piece in a pre-mounted configuration in which the unclamped clamping belt is retained axially relative to said second end piece and in which a first edge of said belt delimits an annular opening through which the first end can be engaged for its fitting with the second end, the belt being intended to be clamped on said end pieces in the fitted state, said first and second end pieces having respectively a first and a second centering surface able, in the fitted state, to axially overlap relative to each other and to come into contact in order to limit the relative clearances between said end pieces with respect to the axis, the belt carrying a retaining lug which extends outside the belt on the side of the first edge of the belt and has a free end able to cooperate with a bearing surface of the first end piece so that, the belt being in the pre-mounted configuration and the end pieces being in the fitted state, the end pieces are retained in the fitted state by the combination of the contact of the centering surfaces which are axially overlapping and of the cooperation of the free end of the retaining lug with said bearing surface of the first end piece, wherein the retaining lug is welded on the belt.

19. A mounting assembly comprising a first end piece having a first end and a second end piece having a second end, said ends being able to be fitted along an axis in a fitted state, the assembly further comprising a clamping belt configured to be disposed around the second end piece in a pre-mounted configuration in which the unclamped clamping belt is retained axially relative to said second end piece and in which a first edge of said belt delimits an annular opening through which the first end can be engaged for its fitting with the second end, the belt being intended to be clamped on said end pieces in the fitted state, said first and second end pieces having respectively a first and a second centering surface able, in the fitted state, to axially overlap relative to each other and to come into contact in order to limit the relative clearances between said end pieces with respect to the axis, the mounting assembly comprising an integrated retaining lug cut out from a section of the belt, the integrated retaining lug having a free end projecting outwardly with respect to the first edge of the belt, said free end being able to cooperate with a bearing surface of the first end piece so that, the belt being in the pre-mounted configuration and the end pieces being in the fitted state, the end pieces are retained in the fitted state by the combination of the contact of the centering surfaces which are axially overlapping and of the cooperation of the free end of the integrated retaining lug with said bearing surface of the first end piece.

\* \* \* \* \*